July 17, 1956

N. W. HANCOCK 2,755,379

R.F. PULSED AMPLIFIER

Filed July 14, 1952

INVENTOR.
NOEL W. HANCOCK
BY
*Marvin Moody*
ATTORNEY 2,755,379
Patented July 17, 1956

2,755,379
R. F. PULSED AMPLIFIER

Noel W. Hancock, Cedar Rapids, Iowa, assignor to Collins Radio Company, Cedar Rapids, Iowa, a corporation of Iowa Application July 14, 1952, Serial No. 298,867

6 Claims. (Cl. 250—27)

This invention relates in general to control means, and in particular to means for biasing and controlling a very high powered electronic tube.

Electron tubes are being built with higher and higher power, with some of them having a peak power of 8½ megawatts. Such tubes might be resnatrons. Tubes of such extremely high power output require large negative bias to cut them off, for example, 10 thousand volts. During conduction there is appreciable grid current that may be in the order of 10 amperes. To control such a high powered tube by supplying the 10,000 volts cut-off potential, presents a problem. Applicant has developed a system which allows the power supply to furnish a high negative voltage to cut off a high powered electron tube but which does not supply the high current necessary during conduction.

It is an object of this invention, therefore, to provide a bias control system for a high power tube.

Another object of this invention is to provide a high voltage power supply which furnishes a very small current to control a high power tube.

Further objects, features and advantages will become apparent from the description and claims when read in view of the drawings, in which:

Figure 1:
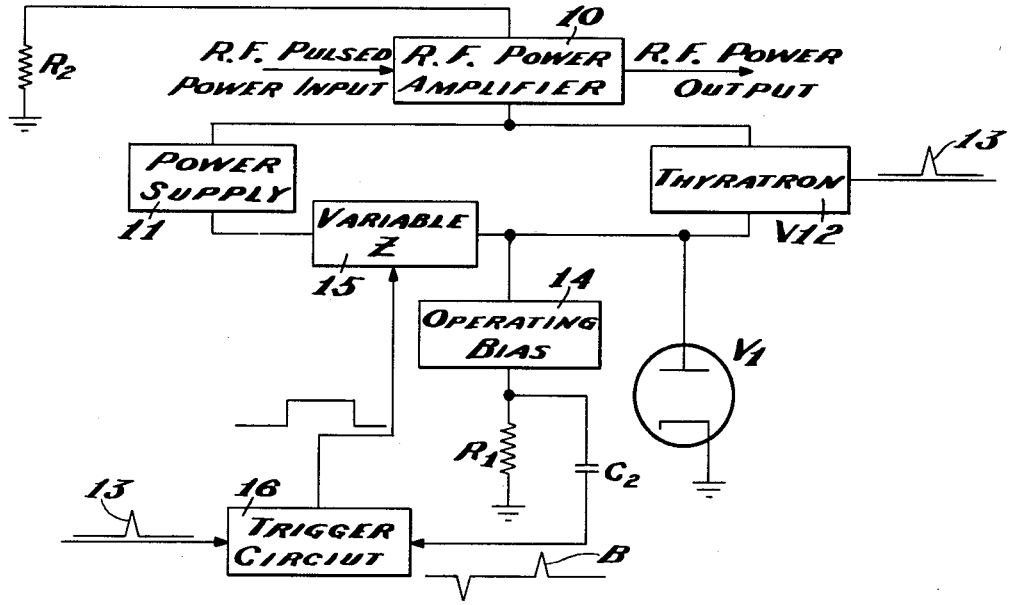
Figure 1 illustrates the control system of this invention.

Figure 1 illustrates a power amplifier 10 which it is assumed is to be operated in a pulsed fashion so that it produces an R. F. carrier during certain intervals and no output at other intervals. The tube 10 may produce an output as low as several hundred kilowatts peak power. A tube has been built which develops 8½ megawatt peak power.

The cut-off bias of the tube 10 may be 8 to 10 thousand volts negative. A power supply 11 is connected to the tube 10 to supply the cut-off voltage. When the tube is placed in a conducting state, the effect of the power supply 11 must be removed and for this purpose a thyratron control tube V12 or other suitable control means is connected across the power supply 11. Thyratron 12 is cut off when the tube 10 is cut off. A triggering pulse 13 puts the tube 12 in a conducting state when an R. F. input C is received by the tube 10. When the tube 12 conducts it provides a low impedance path for the grid circuit of the R. F. amplifier 10 and remains conducting as long as the R. F. grid current tends to flow. An operating bias 14 is connected to the thyratron 12 and to ground through a resistor R₁.

The operating bias 14 controls the operation point of the tube 10 during conduction, as shown by wave form A. A variable impedance element 15 is connected between the power supply 11 and the thyratron 12 and is controlled by a trigger circuit 16 in such a fashion that when the tube 10 is conducting the impedance 15 will have a high impedance so that substantially no current is allowed to flow through thyratron 12 from the power supply 11 when thyratron 12 is conducting. When the tube 10 is not conducting the impedance 15 is very low so that most of the output of the power supply 11 appears across the tube and R₂.

With tubes of the size being controlled, it is necessary to cool the grid circuit with water and thus there is a water leakage path to ground. The water leakage path is represented by the resistor R₂ connected to the tube 10. The power supply furnishes current to the tube 10 which passes through the leakage path R₂ to ground. So as to obtain a completed circuit, a diode V₁ has its cathode connected to ground and its plate connected to the variable impedance 15, which in turn completes the circuit to the power supply 11.

Figure 3:
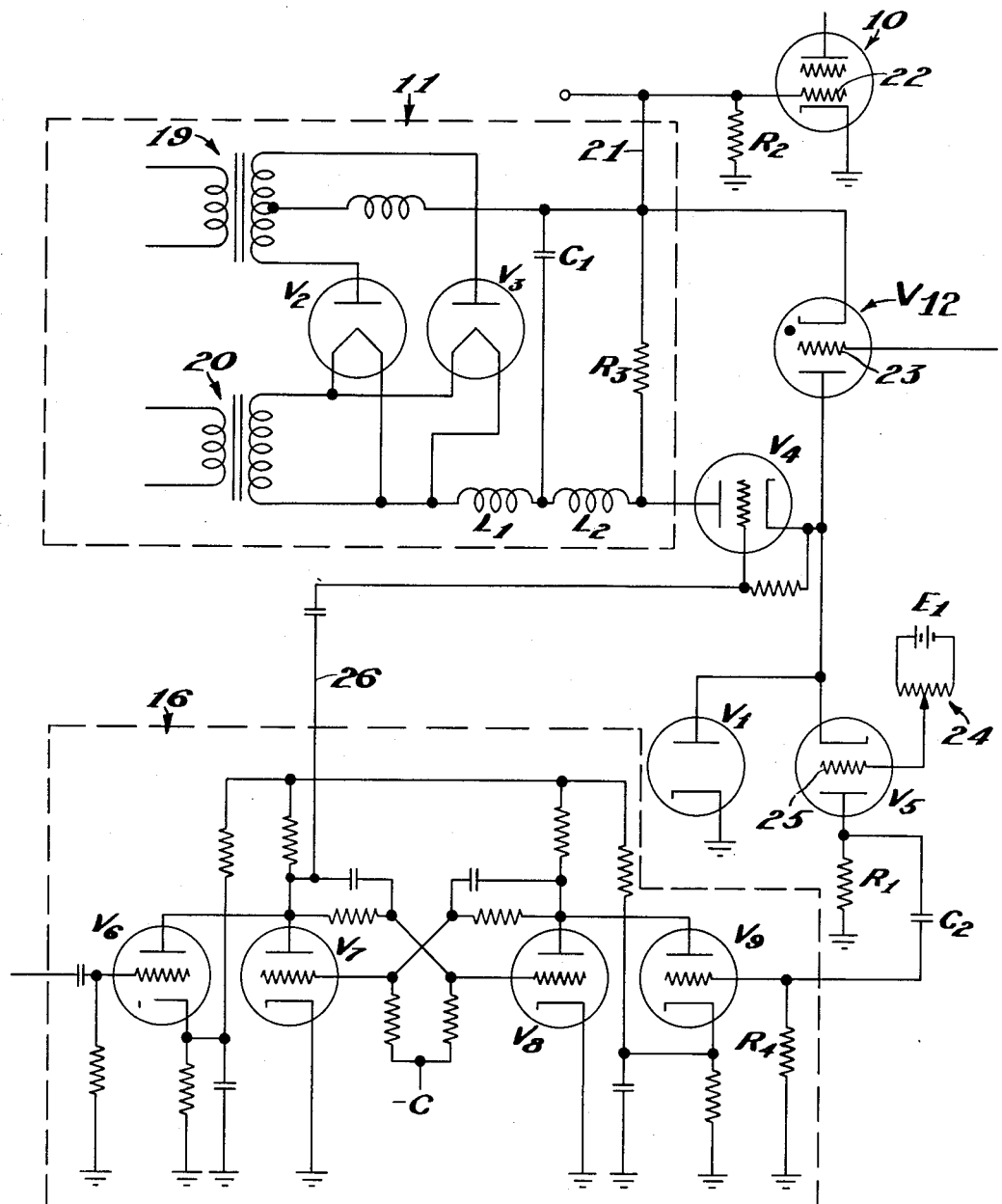
Figure 3 is a detailed schematic of the system according to this invention.

Figure 3 illustrates the power supply 11 which comprises a pair of transformers 20 and 19 which are connected to an A. C. power supply and which are connected to a pair of diodes V₂ and V₃, which rectify the alternating current and supply it to tube 10 through filter means C₁, L₁, L₂, and R₃. The output of the power supply is connected by a lead 21 to the grid 22 of tube 10. The resistor R₂ represents the water leakage resistance which extends from the grid 22 to ground. The power supply is also connected to the thyratron 12 which has its grid 23 connected to a control signal for triggering it on.

The plate of the thyratron is connected to the cathode of a tube V₄ which is the variable impedance 15. The plate of the tube V₄ is connected to the power supply. The operating bias 14 is controlled by a tube V₅ which has its cathode connected to the plate of the thyratron and its plate connected to a resistor R₁ that has its opposite side connected to ground. Tube V₅ constitutes a variable impedance in the path of the grid current of tube 10 and is effective to control the bias of the latter tube.

The grid 25 of the tube V₅ is connected to a potentiometer 24 that is connected to a battery E₁. The bias on the tube V₅ may be manually or servo adjusted to control the bias on tube 10 to alter the shape of the R. F. output pulse when it is conducting. If the R. F. output pulse shape is not to be controlled, a resistor can be used to replace V₁ and V₅. The diode V₁ is connected in parallel with the tube V₅ to complete the circuit to the power supply when the tube is not conducting.

The trigger circuit 16 comprises 4 tubes, V₆, V₇, V₈ and V₉ and has an output lead 26 which is connected to the grid of the variable impedance triode V₄. A trigger pulse is received on the grid of the tube V₆ to trigger the circuit to one condition and a second trigger pulse B is received through a differentiating network comprising resistor R₄ and capacitor C₂ from the tube V₆.

In operation the power supply 11 normally produces a high D. C. voltage as for example 8 to 10 thousand volts and when the tube 10 is not conducting, this voltage is supplied by the lead 21 to the grid 22 of the tube to hold it at cut off. The thyratron 12 is extinguished and the tube V₄ is biased by the trigger circuit so that it has a low impedance. The current from the power supply passes from the lead 21 to the grid 22 and then by the water leakage path R₂ to ground. The cathode of the diode V₁ is connected to ground and current flows through this diode and through the tube V₄ back to the power supply to complete the circuit.

When it is desired to turn the tube 10 on, a trigger pulse 13 is received on the grid 23 of the thyratron to put it into a conducting state and simultaneously on the grid of the tube V₆ to trigger the trigger circuit so that it applies a negative voltage to the variable impedance V₄ for a purpose to be later described. When the thyratron tube fires, it substantially shorts out the power supply and allows the grid current to flow to ground through the resistor R₁, the operating bias tube V₅, from the grid 22 to the cathode of the tube 10 and to ground. The grid current may be in the neighborhood of 10 amperes and due to the shorting action of the thyratron, the power supply does not have to furnish the large amount of power which would be required.

Figure 2:
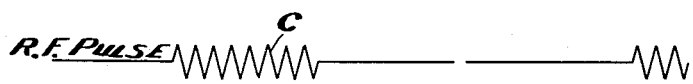
Figure 2 illustrates the shapes of the signals appearing at different portions of the circuit.
Figure 2:
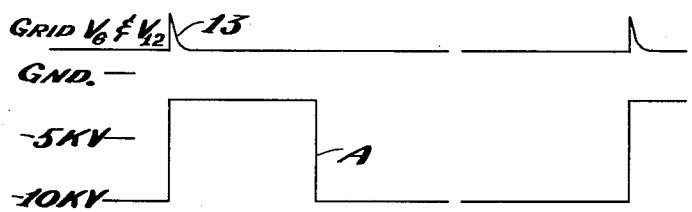
Figure 2:
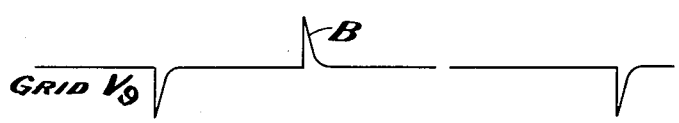
Figure 2:

At the end of the transmitted pulse when it is desired to cut off the tube 10, a trigger pulse B is obtained by differentiating the voltage across the resistor R₁ with the circuit comprising R₄ and C₂. This is supplied to the grid of the tube V₃ to trigger the trigger circuit so that it supplies a positive voltage D through lead 26 to the grid of the tube V₄ so that it once again forms a low impedance. The thyratron 12 is extinguished immediately before the tube V₄ is changed to a low impedance and the high impedance prevents the power supply from maintaining the thyratron 12 in a conducting state. Figure 2 illustrates the various pulse relationships in the circuit.

It is to be noted that the power supply 11 may be a very small one due to the apparatus of this invention which protects it from large power requirements.

Although the invention has been described with respect to a particular embodiment thereof, it is not to be so limited as changes and modifications may be made therein which are within the full intended scope of the invention as defined by the appended claims.

I claim:

1. In combination, an electron tube having cathode and grid electrodes, a bias power supply connected to the said grid electrode of said tube, a switch tube connected to one side of said power supply, a variable impedance connected between the other side of said power supply and said switch tube, a first impedance connected across said switch tube for developing a cut-off bias voltage for said electron tube, a trigger circuit for controlling said variable impedance, an operating bias means for said electron tube connected between said switch tube and said cathode electrode, and pulse supply means for simultaneously energizing said trigger circuit and said switch tube.

2. A control system comprising, a high power tube having a control electrode, a power supply connected at one side to said control electrode of said high power tube, a switch tube connected to said control electrode, an operating bias for said power tube connected to said switch tube, a variable impedance connected between said switch tube and the other side of said power supply, and a trigger circuit having its output connected to said variable impedance for controlling said impedance, and an input circuit of said trigger circuit connected to and energized from said operating bias.

3. A grid bias control circuit comprising, a high power tube having a grid electrode, a high voltage power supply connected at one side to the said grid electrode of said high power tube to drive it to cut-off, a switch tube connected to said one side of said power supply to substantially short it out when the high power tube is in a conducting state, a variable impedance connected between said switch tube and the other side of said power supply to provide a low impedance when the high power tube is cut-off and a high impedance when it is conducting, a trigger circuit connected to said variable impedance to control it and pulse supply means for simultaneously and individually energizing said trigger circuit and said switch tube.

4. A control circuit comprising, a high power tube having a cathode connected to ground and a control grid, a power supply, the control grid of said high power tube connected to one side of said power supply, a switch tube connected to said one side of said power supply to substantially short it out at times through a variable impedance connected between said switch tube and the other side of said power supply, an operating bias impedance for carrying the grid current of said high power tube connected between said switch tube and ground, a trigger circuit having its output connected to said variable impedance to control said impedance, and a differentiating circuit connected to said operating bias impedance for energizing said trigger circuit in response to a change of voltage appearing across said bias impedance.

5. Apparatus for controlling a high power amplifier comprising, a power tube having a cathode connected to ground and a grid electrode, a power supply, a switch tube connected to said grid electrode, said power supply connected at one side to said grid electrode, a variable impedance connected between the other side of said power supply and said switch tube, a resistance connected between said grid electrode and ground for at times carrying a leakage current and developing a cut-off bias voltage, a trigger circuit output connected to said variable impedance, an operating bias supply voltage including an electron tube connected to said switch tube and adapted to conduct the grid current of said power tube when said power tube is in an operative state, a diode tube connected between said switch tube and ground adapted to conduct said leakage current when said power tube is in an inoperative state, and a differentiating circuit connected between said switch tube and ground, and connected to an input circuit of said trigger circuit.

6. A pulsed amplifier grid bias system comprising, an amplifier tube having plate, cathode and grid electrodes, a ground connection to said cathode, a high voltage cut-off bias supply having positive and negative terminals, a current leakage path across said terminals including a serial connection of a leakage resistor and a variable impedance to produce a voltage drop across said resistor, means connecting said grid electrode to one terminal of said resistor effective to supply cut-off bias voltage to said tube when said variable impedance is of low value, a ground connection to the other terminal of said resistor, a thyratron shunted across said voltage supply and said variable impedance for providing a low impedance path for the grid current of said tube when the thyratron is fired, and means for simultaneously and independently firing said thyratron and increasing said variable impedance.

References Cited in the file of this patent

UNITED STATES PATENTS

| | | |
|---|---|---|
| 1,849,865 | Davis | Mar. 15, 1932 |
| 1,984,105 | Zetzmann | Dec. 11, 1934 |
| 2,027,038 | Hansell | Jan. 7, 1936 |
| 2,593,350 | Seybold | Apr. 15, 1952 |